United States Patent
Anderson et al.

(10) Patent No.: US 6,728,750 B1
(45) Date of Patent: Apr. 27, 2004

(54) DISTRIBUTED APPLICATION ASSEMBLY

(75) Inventors: Gary F. Anderson, Danbury, CT (US); Paul Bao-Luo Chou, Montvale, NJ (US); Pasumarti V. Kamesam, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 09/605,712

(22) Filed: Jun. 27, 2000

(51) Int. Cl.[7] .............................................. G06F 15/16
(52) U.S. Cl. ..................... 709/201; 709/203; 709/217; 707/102
(58) Field of Search ................................ 709/201, 202, 709/203, 217, 218, 219, 246; 707/100, 101, 102, 103, 104; 717/1

(56) References Cited

U.S. PATENT DOCUMENTS

| | | | | |
|---|---|---|---|---|
| 5,740,362 A | * | 4/1998 | Buickel et al. ............. | 709/201 |
| 5,953,525 A | * | 9/1999 | Glaser et al. ............... | 717/105 |
| 6,023,578 A | * | 2/2000 | Birsan et al. ............... | 717/105 |
| 6,199,195 B1 | * | 3/2001 | Goodwin et al. ........... | 717/104 |
| 6,363,393 B1 | * | 3/2002 | Ribitzky ..................... | 707/102 |
| 6,377,934 B1 | * | 4/2002 | Chen et al. ................. | 705/10 |
| 6,477,527 B2 | * | 11/2002 | Carey et al. ................. | 707/4 |
| 6,532,465 B2 | * | 3/2003 | Hartley et al. .............. | 707/10 |

* cited by examiner

*Primary Examiner*—Mehmet B. Geckil
(74) *Attorney, Agent, or Firm*—Whitham, Curtis & Christofferson, P.C.; Stephen C. Kaufman

(57) ABSTRACT

A system and a method for developing and dynamically constructing multi-tiered distributed computing applications using a framework which allows the major elements involved in enterprise software applications, namely, the user interface, the data access, and the processing logic, to be independently developed. Moreover, the applications are dynamically created at time of use with pre-built software components or objects. The specifics of the applications such as functions, capabilities, user interface (UI) characteristics, etc., may depend on, for example, the user identity, the user preferences, and the terminal capability. Software development cost and turn-around time are reduced, promoting consistent UI design thus reducing user training cost, and allowing the applications to be dynamically created according to the user profile.

4 Claims, 12 Drawing Sheets

DISTRIBUTED APPLICATION ASSEMBLY

BACKGROUND OF THE INVENTION

1. Field of the Invention

The present invention generally relates to enterprise database management and, more particularly, to a method for developing and dynamically constructing multi-tiered distributed computing applications.

2. Background Description

Enterprises of all types, be they commercial or non-commercial, have significant amounts of distributed data and large numbers of persons to access, review, and/or update and in other ways modify that data. This data processing requirement is addressed by the use of computers, network infrastructures, and software applications. Typically, the data is stored using commercially available database software, and it is transported around the network using standard communication protocols embraced by all system manufacturers.

The software applications which extract the information from the database, package it for transmission over the network, and provide analytical and review capabilities to the enterprise users are often designed and constructed by the enterprise itself to meet the specific needs of that enterprise's user community. This usually involves substantial development efforts over significant periods of time, often resulting in either applications which fail to meet the evolving needs of the user community or software which is ultimately not deployed for use. An additional problem is that within large enterprises, software applications developed by different business units are unable to integrate with each other and result in duplication of effort and what is often referred to as application silos within an enterprise. These silos are independent, standalone enterprise data processing solutions which focus on a particular business area of an enterprise, such as a product line, and are unable to deal with enterprise-wide data processing needs in area such as customer relationship management.

Another problem with the software applications currently being developed by enterprises is that they often do not share a common user interface or interaction metaphor. This causes increased training costs when the user community accesses and interacts with enterprise data through disparate and incompatible software applications.

SUMMARY OF THE INVENTION

It is therefore an object of the present invention to provide a system and a method for developing and dynamically constructing multi-tiered distributed computing applications.

According to the invention, there is provided a framework for developing multi-tiered distributed enterprise applications. This framework allows the major elements involved in enterprise software applications, namely, the user interface, the data access, and the processing logic, to be independently developed. Moreover, the applications are dynamically created at time of use with pre-built software components or objects. The specifics of the applications such as functions, capabilities, user interface (UI) characteristics, etc., may depend on, for example, the user identity, the user preferences, and the terminal capability. In other words, the invention is aimed at reducing software development cost and turn-around time, promoting a consistent UI design thus reducing user training cost, and allowing the applications to be dynamically created from independently developed software components according to the user profile.

The invention embodies the following main concepts:

1. A multi-tiered application is composed of three types of objects:

Graphical User Interface (GUI) objects—Centrally developed objects which allow the user to interact (e.g., view, create, modify) with enterprise data. GUI objects can be composites of other GUI objects.

Business Logic (BL) objects—Objects which provide analysis, transformation, validation and other services on enterprise data.

Enterprise Data Adapter (EDA) objects—Objects which transfer data between the tiers of a multi-tiered network application, including the persistent enterprise data store.

2. The GUI, BL and EDA objects contain no application specific data encapsulation objects for data which is defined by the enterprise data model. BL objects encapsulate only application and enterprise business rules. The GUI and BL objects are built using data semantics from the enterprise data model, not application specific semantics.

3. The GUI, BL, and EDA objects communicate with each other, by passing encapsulated data in the form of Generic Data Encapsulation (GDE) objects which contain the embedded data semantics. There is also a facility for creating and routing of GDE objects within an application.

4. Applications running in the client and business logic tier(s) are dynamically created at runtime by loading GUI, BL, and EDA objects according to a configuration document provided by a centralized configuration service which typically has an authentication mechanism.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The System Architecture

Figure 1:
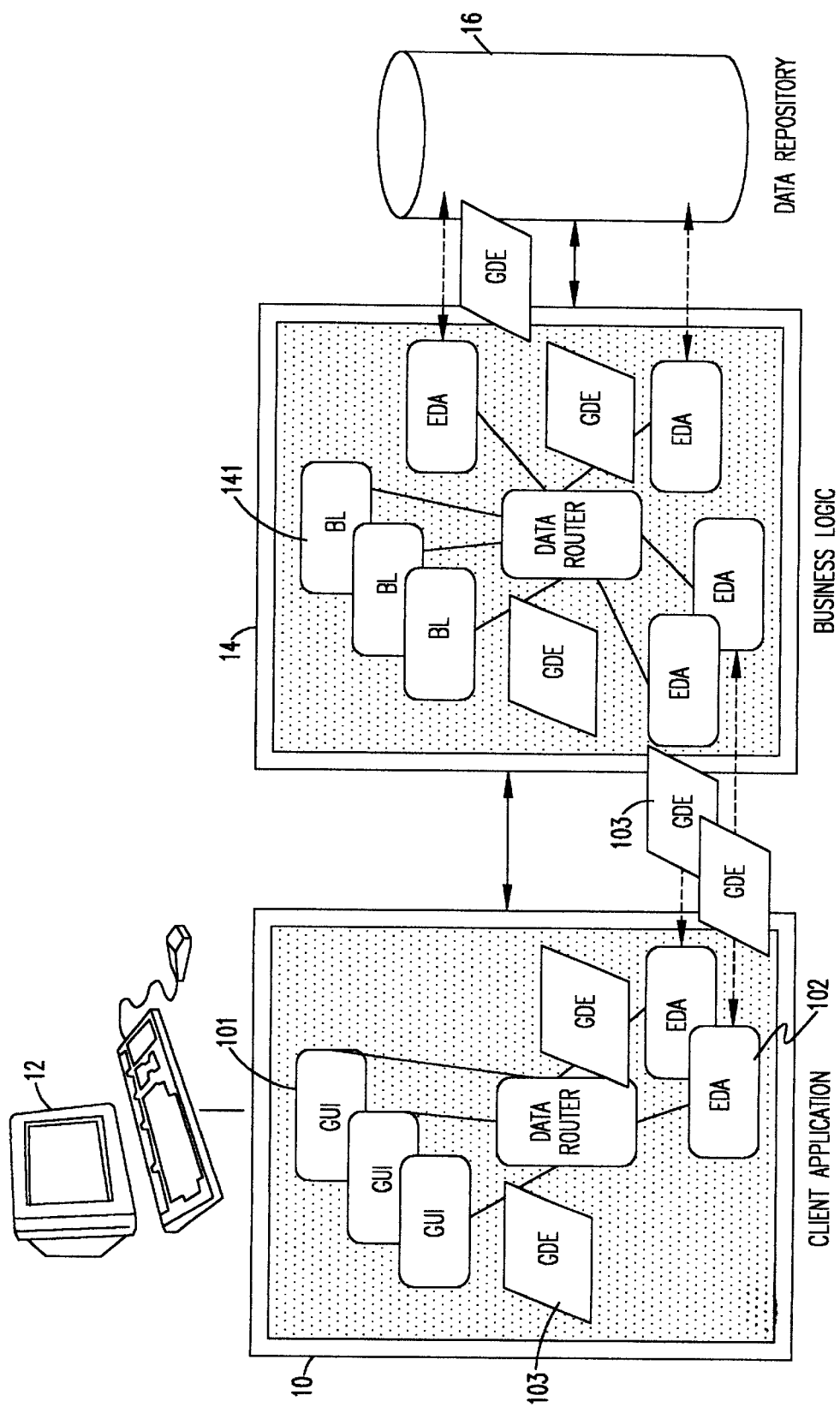
FIG. 1 is a block diagram of the system architecture of the invention.

Referring now to the drawings, and more particularly to FIG. 1, there is shown the system architecture of the system according to this invention. The system comprises a client application 10 running on a client machine 12. The client application 10 communicates with business logic 14 contained in one or more tiers of the networked application. The business logic 14 accesses a data repository 16, which may be centralized or distributed depending on networked system.

1. The Dynamically Created Client Application

The client application 10 provides a user working on client machine 12 the ability to interact with enterprise data. This client application is created at the time of use by discovering on the network infrastructure, and loading from the network infrastructure, two types of software components. The first type of software component is a Graphical User Interface (GUI), consisting of one or more GUI objects 101, which allows the user to interact with the computer by some input device such as a mouse or keyboard, etc. The second type of component is an Enterprise Data Adapter (EDA), consisting of one or more EDA objects 102, which allows the dynamically constructed application to locate, obtain, and update enterprise data which exists persistently somewhere on the network. In some cases, there may be a third type of component, consisting of Business Logic (BL) objects 141, which provides some application specific processing. Typically, these objects will be located on another tier of the network computing application as illustrated in FIG. 1, although this invention does not require this to be the case. The GUI 101 and EDA 102 components are mutually independent and have no knowledge of each other's existence and/or functionality. This is also true for any BL 141 components if present.

The creation of the of the client application is accomplished using the following method:

1. A bootstrap application is loaded from the local computing node or over the network using standard techniques. The bootstrap application then connects to a configuration service on the network, typically requiring the user to provide authentication information.
2. The configuration service then creates an application specification tailored to the individual user or category of user. This specification is transmitted back to the client bootstrap object, preferably in the form of an XML (extensible Markup Language) document, which can be parsed by the bootstrap object and used to configure the GUI. The application specification document includes the information on where to locate and retrieve the GUI, EDA, and possibly BL objects which constitute the client application.
3. The client bootstrap object retrieves the code specified in configuration documents from the network, instantiates, if necessary, the objects involved in the application, and creates an initial user interface for the application.

2. The Business Logic

The business logic 14 can be contained in one or more tiers of the networked application. Typically, business logic deals with processing operations such as transformation, constraint checking, and conversion of data into information. These business logic operations are implemented using the BL objects 141 referred to above. Often BLs are aggregated into larger modules to perform complicated business operations.

3. The Data Repository

In this networking computing methodology, the data models which define the enterprise data store 16 provide the ubiquitous semantics used by the other layers of the networked application. Typically, much effort goes into defining and implementing enterprise data schemas. Typically, the schema does not make it past the application boundary where the data extracted from the repository are converted into application specific objects. This will be discussed later in the section on the development metaphor. Suffice it to say at this point that this invention suggests the propagation of the underlying enterprise data model to all layers of the networked application.

Concepts and Methodology

The current invention proposes the following conventions which will be useful in many enterprise applications:

1. GUI Development

The problem of GUI consistency discussed in the Background section is reduced by our methodology and architecture. Developers responsible for creating GUI objects need not be concerned with either business logic issues or application specific data semantics. The GUI developers can expect information to be provided to them in the form of Generic Data Encapsulation (GDE) objects 103 according to the enterprise wide data semantics. Similarly, if they need to send information to other components, or even request information from other components, they can do so using GDE objects. The GUI developers only need to specify what type of information they will be expecting or generating, so that the application configuration service discussed above can locate the appropriate Enterprise Data Adapters (EDAs) 104.

2. Enterprise Data Adapters

EDA objects 104 are the connector objects which bring data in and out of a computing layer. It is anticipated by the current invention that the EDA objects will read and write XML documents which are transmitted via normal communication protocols such as HTTP (HyperText Transfer Protcol) or TCP/IP (Transfer Control Protocol/Internet Protocol). There are really two types of EDA objects. One type of EDA object has no need to understand the type of data it is handling, only the source and destination of data that it reads and writes. Typically, this type of EDA will connect the client tier 10 with the business logic tier 14 of the networked application. The second type of EDA is responsible for reading and writing data from the enterprise data store 16. In this case, the EDA will generally have some specific application related processing logic which will understand how to move data between the GDE objects and the persistent store. The current invention allows this conversion to be dealt with at the data store level by a database application which is GDE or XML aware, in which case the second type of EDA would not be required. It is envisioned that for either type of EDA, data driven generic implementations of such objects would probably be used. In no case would the EDA have any awareness of the presence or functionality of the components in the system that created or requested the GDE objects.

3. Application Configuration

The invention expects that the client application tier 10 will be dynamically created as discussed above. The invention also allows the business logic tier 14 to be similarly created using the same mechanism to assemble required EDA and BL objects to create an application. In this case, the bootstrap application would identify itself as a process rather than a user, but would configure itself in exactly the same manner as the client tier.

4. GDE Routing

Fundamental to this invention is the presence of a service object which will route GDE objects between and among GUI, EDA, and BL objects. This routing object will not handle any transmission of GDE objects between computing tiers. The invention expects that the GDE routing capability would exist at both the client and business logic tiers.

5. Business Logic Objects

BL objects 141 contain all of the rules governing processing enterprise data into useful information as well as controlling the entry of valid data into the enterprise data store. The invention expects that the BL would interact with data in the form of GDE objects and would not need to encapsulate any data which is part of the definition of the persistent enterprise data store. The BL objects would receive data as needed by the routing facility, just like the GUI objects and the EDA objects, as in the case of GUI development.

EXAMPLE IMPLEMENTATION

Figure 2:
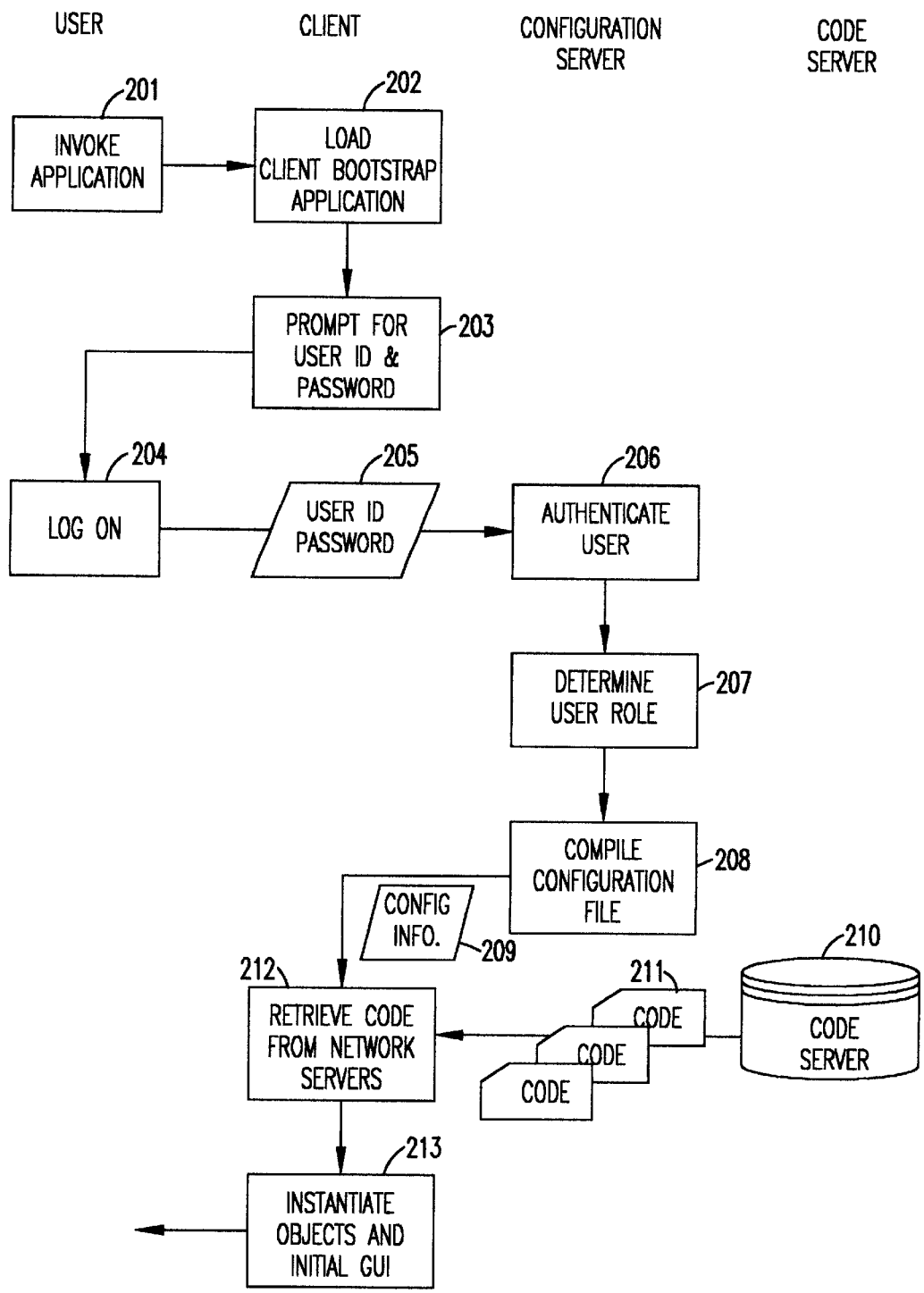
FIG. 2 is a flow diagram showing the process steps for instantiating an application for a user.
Figure 4:
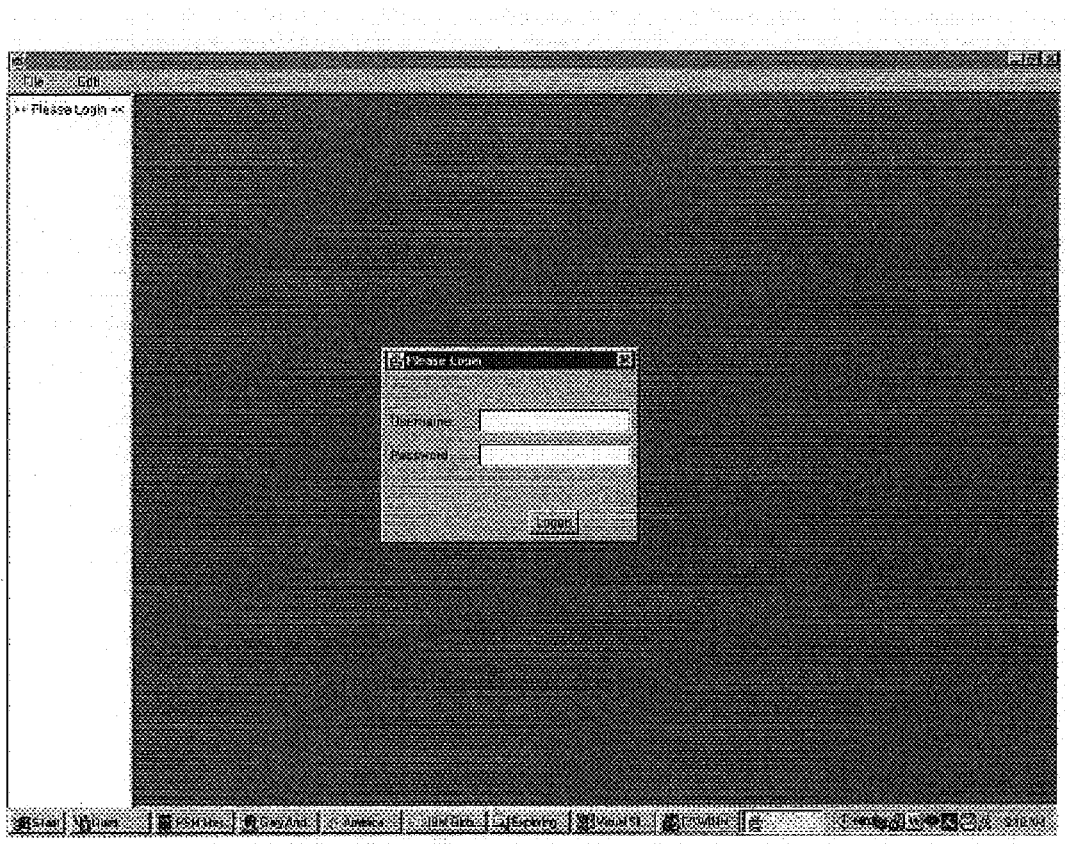
FIG. 4 is a screen print showing the graphic user interface (GUI) for the user login screen.

Here we describe an example implementation of the invention. In the example implementation, the user invokes a bootstrap Java™ application on their machine. When the application appears, it really contains no functionality other than to allow the user to login and retrieve the configuration information necessary tailor the application to the individual user. The flow of this process is illustrated in FIG. 2, to which reference is now made. In function block 201, the user invokes the Java™ application. The client bootstrap application is loaded in function block 202. An application shell such as the one shown FIG. 4 appears prompting the user to enter his or her User ID and Password in function block 203.

Other authentication methods could also be used, such as a smart card and biometric identification (e.g., finger print, voice, etc.), for example. The user then performs a login which consists of entering the prompted authentication information 204 (User ID/Password) into the dialog box. This information is sent to a configuration server. The configuration server checks the User ID and Password 205 to authenticate the user in function block 206, and possibly the role being performed by the user in function block 207, and compiles an XML configuration file in function block 208 which contains the configuration information 209 necessary to add functionality to the client application. The necessary code 211 is retrieved from the network servers 210 in function block 212, and the objects and initial GUI are instantiated in function block 213. After the configuration information is returned, the desktop may appear as shown in FIG. 5.

Figure 5:
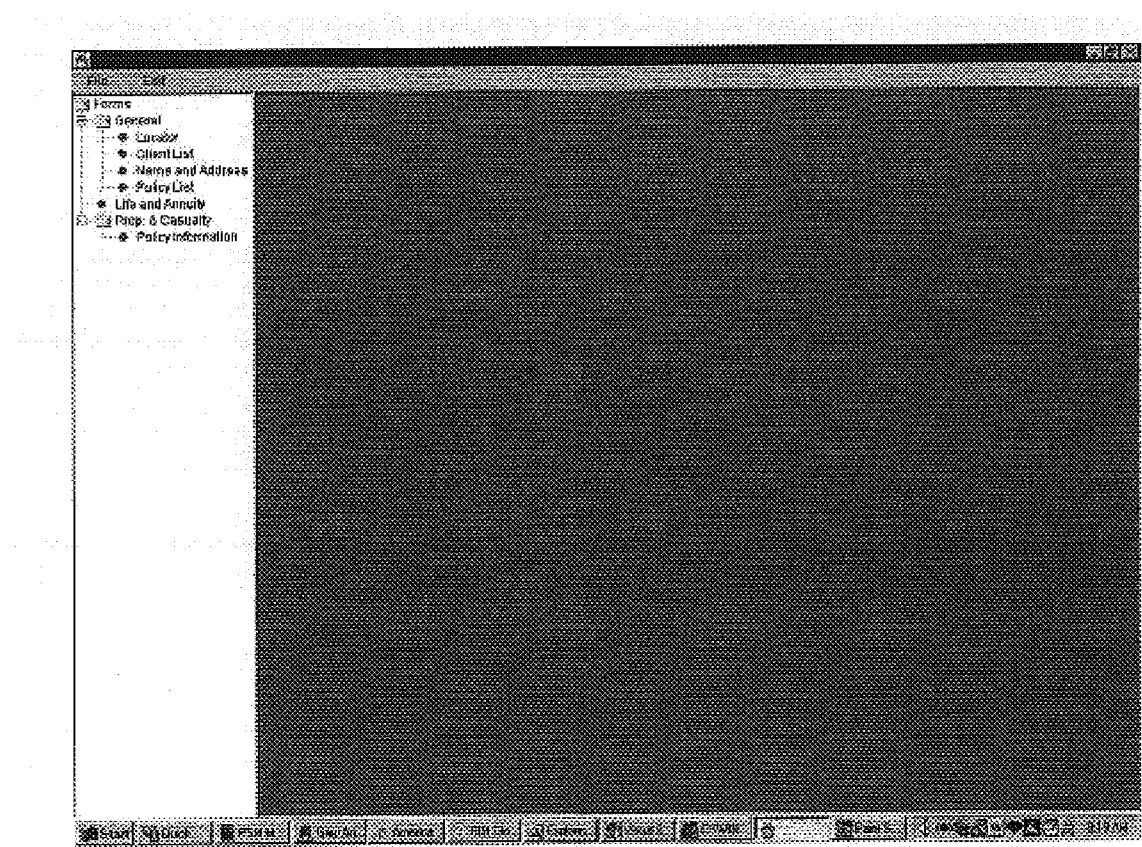
FIG. 5 is a screen print showing the graphic user interface (GUI) for the desktop screen based on the returned configuration information for the user.

The entries in the left panel of the GUI window in FIG. 5 indicate forms which are active for the user. For instance, if the user selects the "Name and Address" form, a GUI will appear that can display contact information about a customer. This is shown in FIG. 6.

Figure 6:
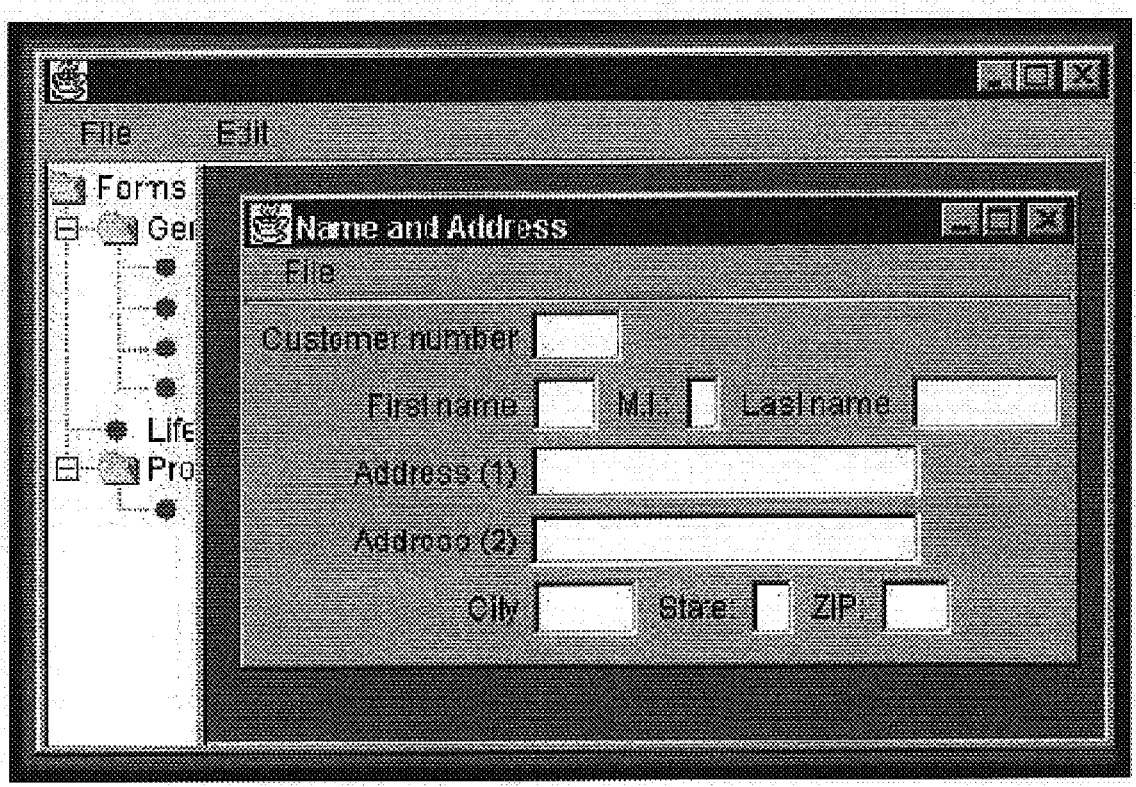
FIG. 6 is a screen print showing the graphic user interface (GUI) with "Name and Address" window opened as a result of selecting that object from the configuration menu.
Figure 7:
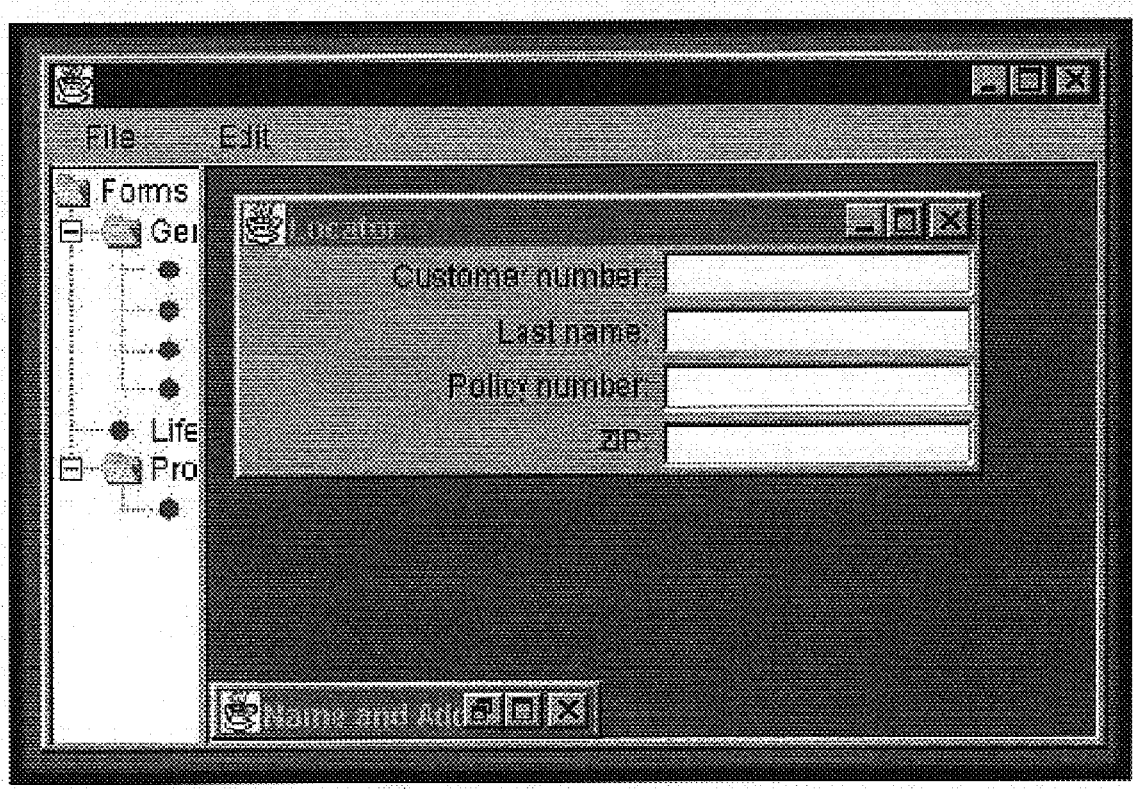
FIG. 7 is a screen print showing the graphic user interface (GUI) with the "Locator" window opened as a result of selecting that object from the configuration menu.

The "Name and Address" panel shown in FIG. 6 is not intended to be used independently, but in conjunction with the "Locator" panel which is shown in FIG. 7. Note that the address panel has been minimized for the purposes of illustration within this document.

At this point in the process, the user can begin interacting with the enterprise. The user might enter a customer number in the "Locator" panel shown in FIG. 7. To understand this flow, we need to explore a few additional concepts discussed in the next section.

Configuration Details and Enterprise Interaction

Once the user has the configured desktop, they can begin to interact with the UI which will cause the application to interact with other applications located on enterprise servers. To understand how this works, we need to examine the XML file which was used to create the user's desktop. The file is shown below:

```
<?xml version="1.0"?>
<!DOCTYPE DAAFORMS SYSTFM "http://watermargin/daa/DAAForms.dtd">
<DAAFORMS>
    <FOLDER FOLDERNAME="Forms">
        <FOLDER FOLDERNAME="General">
            <FORM UICLASSSOURCE="http://watermargin/daa/classes"
                DATACLASS="com.ibm.irc.daa.demo.infoprovider.PartyListProvider"
                DATACLASSSOURCE="http://watermargin/daa/classes"
                UICLASS="com.ibm.irc.daa.demo.ui.RecordFinder"
                FORIMNAME="Locator"/>
            <FORM UICLASSSOURCE="http://watermargin/daa/classes"
                DATACLASS="com.ibm.irc.daa.demo.infoprovider.PartyListProvider"
                DATACLASSSOURCE="http://watermargin/daa/classes"
                UICLASS="com.ibm.irc.daa.demo.ui.UICustomerTable"
                FORMNAME="Client List">
            <FORM UICLASSSOURCE="http://watermargin/daa/classes"
                DATACLASS="com.ibm.irc.daa.demo.infoprovider.NameAndAddressProvider"
                DATACLASSSOURCE="http://watermargin/daa/classes"
                UICLASS="com.ibm.irc.daa.demo.ui.UINameAndAddressPanel"
                FORMNAME="Name and Address">
            <FORM UICLASSSOURCE="http://watermargin/daa/classes"
                DATACLASS="com.ibm.irc.daa.demo.infoprovider,PolicyListProvider"
                DATACLASSSOURCE="http://watermargin/daa/classes"
                UICLASS="com.ibm.irc.daa.demo.ui.UIPolicyTable"
                FORMNAME="PolicyList"/>
        </FOLDER>
        <FOLDER FOLDERNAME="Life and Annuity"></FOLDER>
```

```
        <FOLDER FOLDERNAME="Prop. & Casualty">
            <FORM UICLASSSOURCE="http://watermargin/daa/classes"
                DATACLASS="com.ibm.irc.daa.demo.infoprovider.AutoPolicy Provider"
                DATACLASSSOURCE="http://watermargin/daa/classes"
                UICLASS="com.ibm.irc.daa.demo.ui.UIAutoPolicyInformationPanel"
                FORMNAME="Policy Information"/>
        </FOLDER>
    </FOLDER>
</DAAFORMS>
```

There are two basic XML Tags used to configure the desktop. FOLDER tags just allow a hierarchical aggregation of forms into categories. The FORM tags actually specify the manner in which the application will interact with both the user and the enterprise. The FORM tag has five XML attributes.

1. UICLASSSOURCE—This specifies the URL (uniform resource locator) of the enterprise server which contains the Java™ code used to display the UI panel specified by the UICLASS attribute.
2. UICLASS—This specifies the Java™ class which is used to display the user interface associated with the individual form or panel.
3. DATACLASSSOURCE—This specifies the URL of the enterprise server which contains the Javam code used to load data as specified by the DATACLASS attribute.
4. DATACLASS—This specifies a Java™ class which acts as an intermediary to interact with an enterprise server and acquire information needed by a client application.
5. FORMNAME—This is the name which should be used by the desktop application to refer to this form.

An example to illustrate the use of these tags. To display the "Locator" panel discussed earlier and shown in FIG. 7, the com.ibm.irc.daa.demo.ui.RecordFinder class is loaded. In addition, there is a class responsible for fetching the data associated with this UI component, in this case com.ibm.irc.daa.demo.infoprovider.PartyListProvider.

The two classes are related by the configuration file, but in terms of the application program, they are unaware of each other. It is a basic premise of this invention that UI components and data access components will be developed in a distributed manner. A UI development group working with the business process people might develop the UI components for an application and deploy the code on their server. A group of developers working with database analysts might develop the data access components and deploy them on a separate server. As long as the two groups agree on the data semantics, the two sets of components should work together even though the classes are totally unaware of each other. This brings us to the second concept needed to explain the flow of the example. That is the concept of Generic Data Encapsulation.

Generic Data Encapsulation

Figure 3:
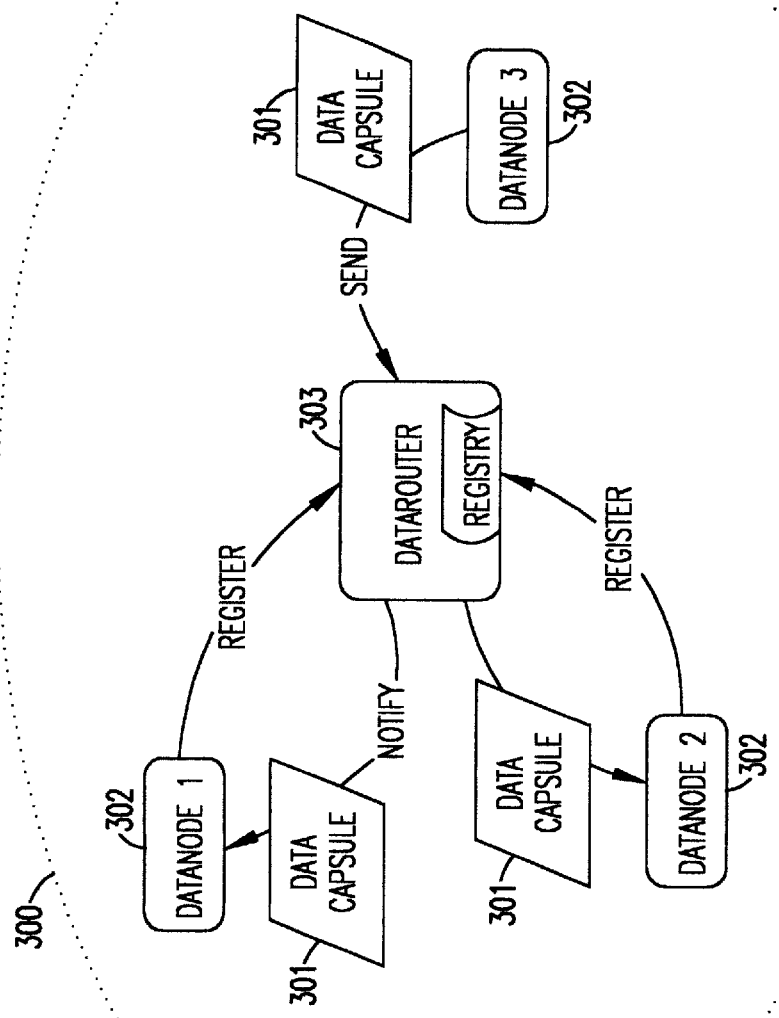
FIG. 3 is a block diagram illustrating how Generic Data Encapulation works.

This is a concept which provides the basic data plumbing used by this invention. The idea is to encapsulate all enterprise data (as opposed to control data used by an application) in the form of a generic object 300, which contains the embedded data semantics, as illustrated in FIG. 3. The sample application uses an implementation of this concept called DataCapsules.

1. DataCapsules com.ibm.datacapsules is a Java™ package which provides a facility for creation and routing of generic data encapsulation objects within an application. In addition, the com.ibm.datacapsules.xml package provides the facility for applications to share DataCapsule objects 301 in a distributed manner using XML documents or streams.

com.ibm.datacapsules is a simple but powerful package. At its most basic it consists of just three types of Objects:

1. DataCapsule—A DataCapsule 301 is a generic container which encapsulates one of two things: Zero or more additional DataCapsules or zero or more items which are just name/value pairs where the names are simple strings which have meaning only to the application and values are any type of Object.
2. DataNode—A DataNode 302 is just an Object which is interested in receiving notification when any DataCapsule 301 of a certain category is introduced into the system and which has an implemented interface for both sharing the interest categories and receiving notification of the presence of the DataCapsule.
3. DataRouter—The DataRouter 303 has responsibility of accepting DataCapsules 301 from other Objects which might generate them, maintaining records of DataNodes 302 which are interested in categories of DataCapsules and dispatching notifications to the DataNodes in a timely manner.

In addition to these basic concepts there are interfaces which allow applications to validate and convert DataCapsules in an application specific manner. These are the DataValidator and DataConverter interfaces. Since com.ibm.datacapsules is implemented as a Java™ package which will run in a JVM (Java™ Virtual Machine) which might be shared with other applications, there is an additional concept of a DataDomain which will allow each set of applications to maintain a separate name space for DataCapsule categories and DataNode registrations.

com.ibm.datacapsules.xml is a package which contains classes which can convert a DataCapsule to an XML document or stream and convert an XML document or stream back to a set of Java™ DataCapsules. The conversion from XML to Java™ is done using a XML DOM (Document Object Model) parser, although there is also an implementation using a SAX (Simple API for XML) parser which is being developed and tested.

2. com.ibm.datacapsules

The origins of this package relate to frustration at building yet another set of Java™ classes which basically did nothing except encapsulate the information present on a GUI screen. For instance, if you have a customer address screen as shown in FIG. 6, a common practice is to create an object which basically stores all of the data associated with the screen and has little or no business logic associated with it. This creates two maintenance problems. If you add information to the screen, you typically have to modify the underlying data encapsulation class. The other problem is that often the information displayed on the screen either originates in separate enterprise systems, or some part of it is also displayed on another screen.

Using com.ibm.datacapsules eliminates both of these problems. Since the semantics of the data is stored in the generic DataCapsule 301, only the screen need to be modified if information is added or removed. If the information is shared by multiple screens, they each register themselves as a DataNode 302 with the registry of the DataRouter 303 having the appropriate interest. If the data for a screen originates in separate enterprise processes, the screen object just registers for multiple categories of DataCapsules.

In addition, using the com.ibm.datacapsules package, it should be possible to just say "NO" to creating any application specific data encapsulation objects.

For an enterprise, there can be an additional benefit of using com.ibm.datacapsules. Perhaps an application contains three types of modules; GUI screens, business logic, and data input/output (I/O) classes. These classes can be developed independently if all of the teams agree on the data semantics. For instance, a GUI object can issue a request for a particular type of information by creating a DataCapsule belonging to a "request" category. A data I/O class might monitor for certain "request" DataCapsules and then fetch some data from the enterprise. It would then create some "result" DataCapsules which could be passed on to the GUI or even be intercepted and validated by the business logic objects before "validated" DataCapsules were sent on for the GUI objects to display.

3. Specifics

Since the DataCapsule concept is quite simple, the com.ibm.datacapsules package comes with default implementations which allow an application to begin using the technology without really implementing any datacapsules themselves. We discuss below the basic technical aspects of each of the classes and interfaces which make up the package. There is a separate set of application program interface (API) documentation in javadoc format which provides programming level information.

1. DataRouter

The com.ibm.datacapsules.DataRouter is a "singleton" object (one instance per JVM) which is responsible for maintaining the list of DataNode objects for each DataDomain and dispatching DataCapsules to them as needed. Note that the DataDomain object is a private class and only exposes a simple "string" name to the outside. When adding and removing DataNodes from the registration tables maintained by the DataRouter, the user provides a "domain" qualifier string. The DataRouter is multithreaded in that Objects creating DataCapsules and sending them to the DataRouter will continue executing while the appropriate DataNodes (including possibly the originating object) are notified.

2. DataNode

The com.ibm.datacapsules.DataNode is a Java™ interface which has a getDataInterests method which must respond with details about the categories of DataCapsules in which the DataNode has an interest. It also has a dataNotification method which is used by the DataRouter to provide notification of a new DataCapsule. In most cases, the implementation of the DataNode interface will be extremely simple.

3. DataCapsule

A com.ibm.datacapsuies.DataCapsule has several concepts associated with it. It provides an API for addition and removal of data items which are really name/value pairs. It also has some intrinsic properties itself. Every DataCapsule has a category or base name which classifies it into a certain type of DataCapsule which should have meaning to an application. For instance if a DataCapsule is meant to contain customer information, it might be given a "Customer" base name. The base name is the string which is used to route DataCapsules to registered DataNodes. The com.ibm.datacapsules framework attaches no semantic meaning to the category strings. They are strictly an application level concept. In addition, each DataCapsule has an Object which is the key for the DataCapsule. While it is recommended that these keys be unique within an application or process, this is strictly an application level concept which is not used by the DataRouter. It provides a useful hook for an application to tell one DataCapsule from another when they are from the same category. The names associated with the items contained by a DataCapsule is also strictly an application level concept and is transparent to the DataRouter, etc. One possible scenario is that the names associated with the items are derived from some enterprise wide data schema so that components of an application can be built independently and still share data in a seamless manner. This is strictly an implementation issue. As they say, you can bring a horse to water, but you can't make them drink.

4. DefaultDataCapsuleImpl

Since all of the information encapsulated by the DataCapsule is application specific, the com.ibm.datacapsules package provides a generic implementation of a DataCapsule which will probably be sufficient for almost any use of the package. If for some reason, the application needs to add behavior, the class may be extended.

5. DefaultDataValidatorImpl and DefaultDataConverterImpl

These are just stub applications which basically do nothing except provide a base class for extending. As far as the com.ibm.datacapsules.DefaultDataValidatorImpl is concerned, all DataCapsules are valid. As far as the com.ibm.DefaultDataConverterImpl is concerned, all DataCapsules are converted into themselves.

Example Flow

Figure 8:
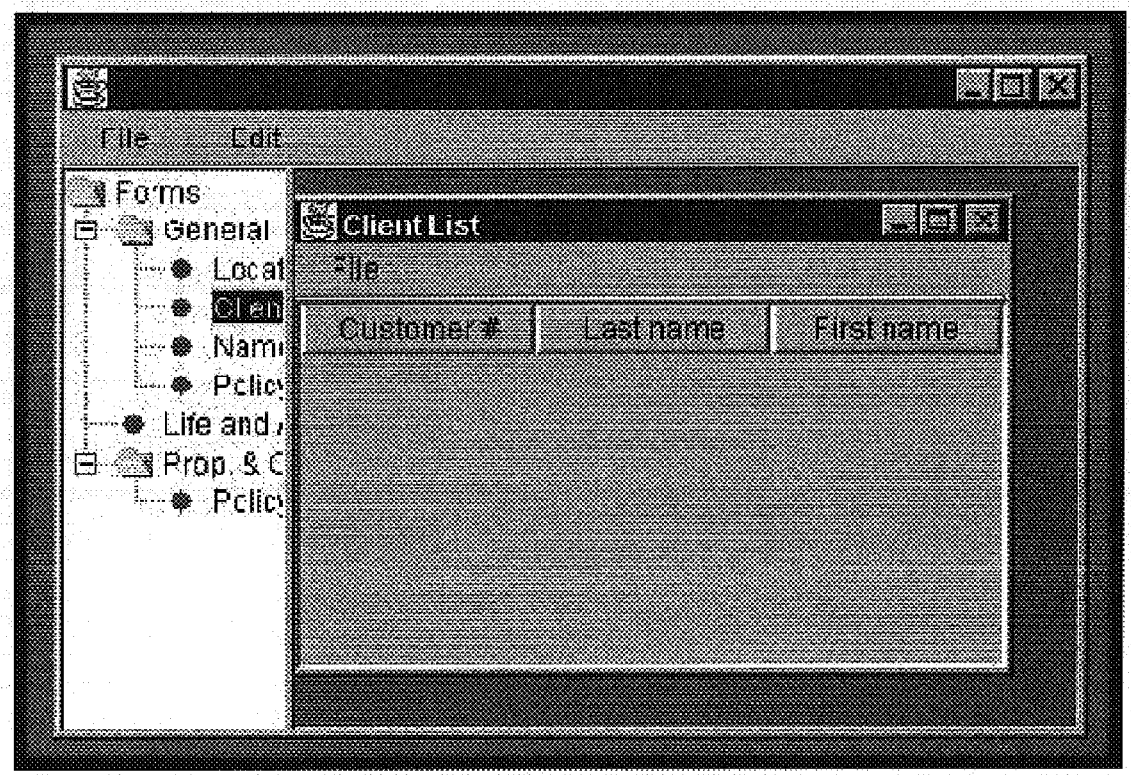
FIG. 8 is a screen print showing the graphic user interface (GUI) with the "Client List" window opened as a result of selecting that object from the configuration menu.

Let us look at a flow for the example we discussed above. Suppose the user wanted to locate a customer name Gary Anderson and the user knew the postal code, but not the customer number. They might type in the last name in the "Locator" panel, shown in FIG. 7, and display a list of all of the Andersons in the "Client List" panel, as shown in FIG. 8.

Figure 9:
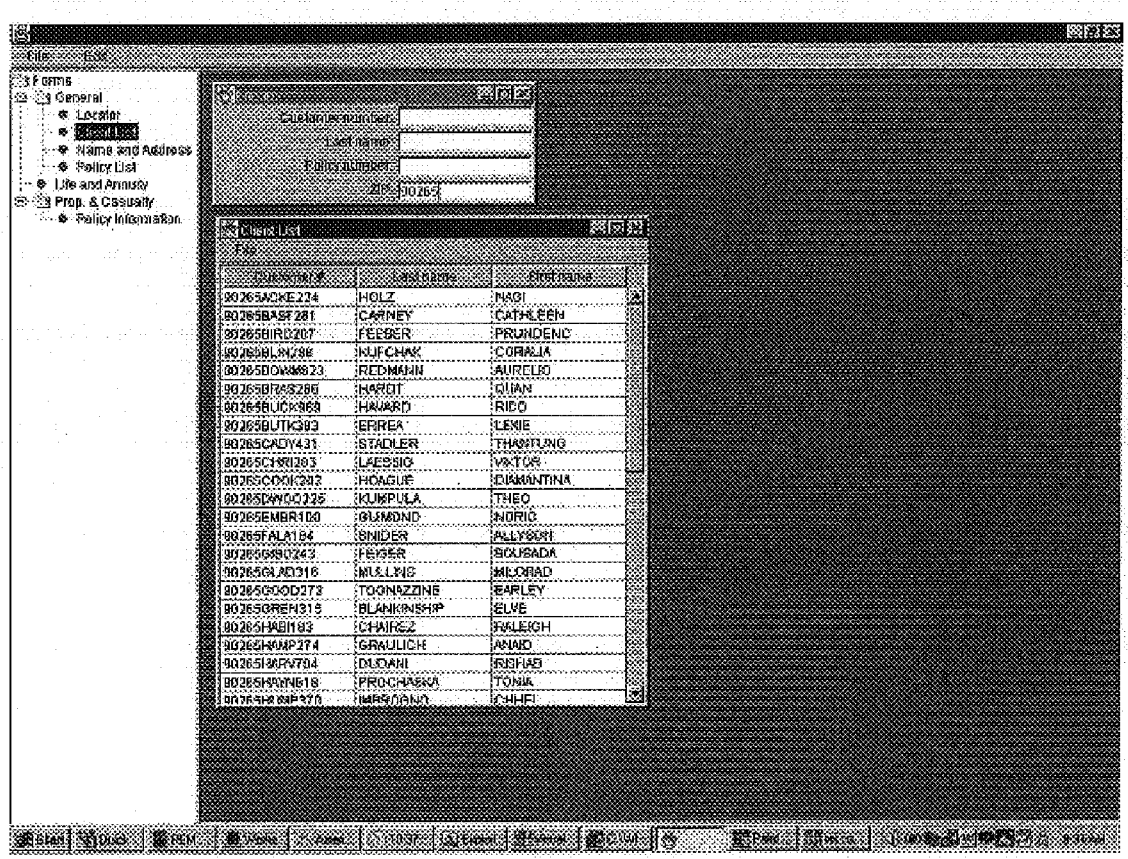
FIG. 9 is a screen print showing the graphic user interface (GUI) with the "Locator" and "Client List" windows open.
Figure 10:
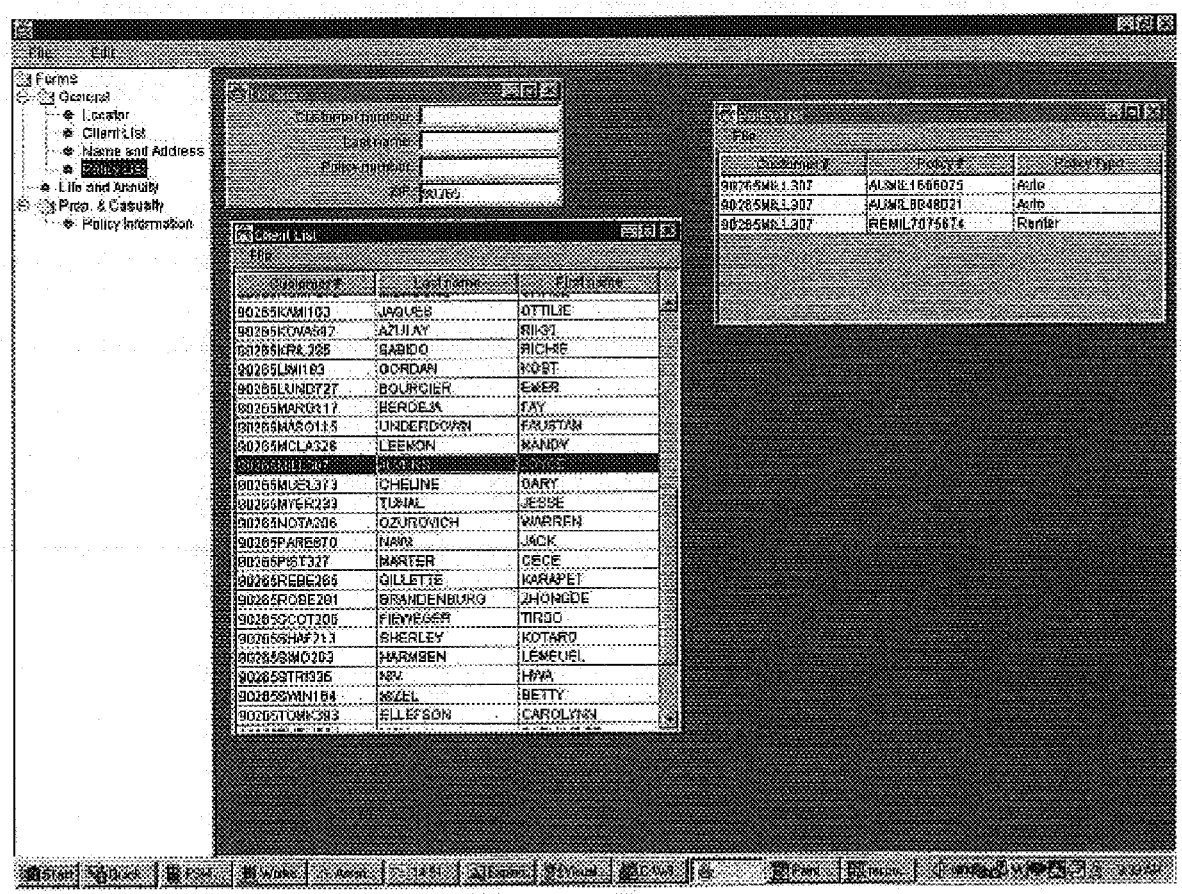
FIG. 10 is a screen print showing the graphic user interface (GUI) similar to FIG. 9 but additionally with the "Policy List" window open.
Figure 11:
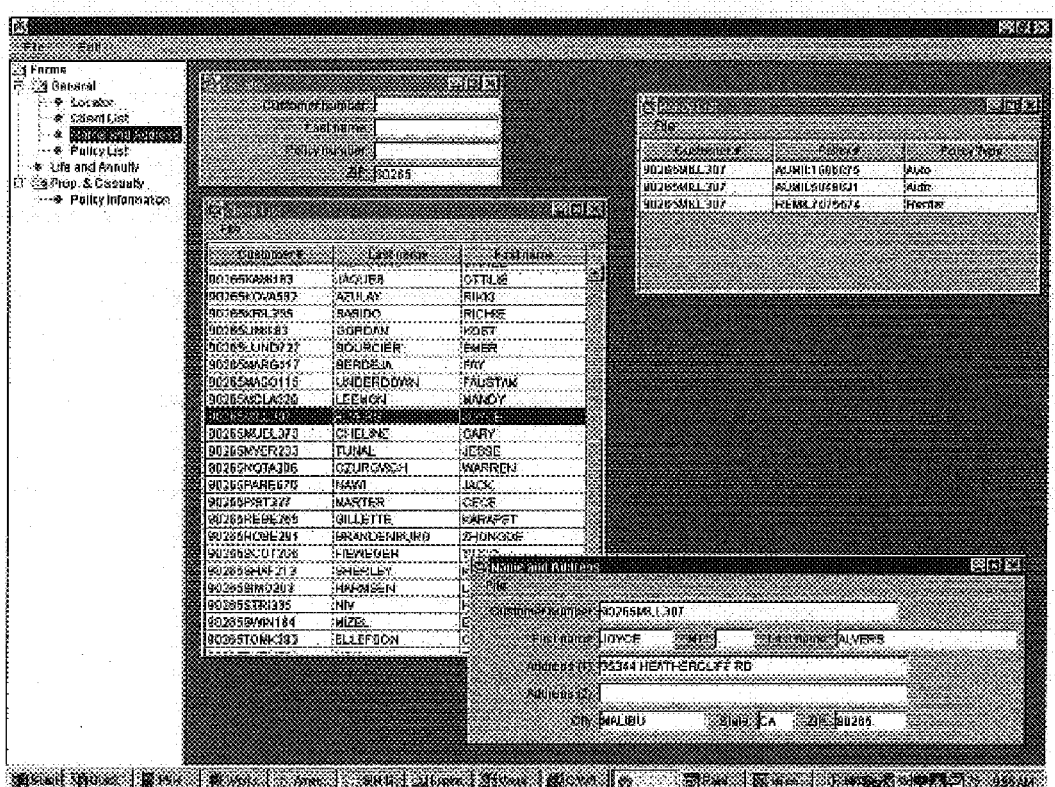
FIG. 11 is a screen print showing the graphic user interface (GUI) similar to FIG. 10 but additionally with the "Name and Address" window open.
Figure 12:
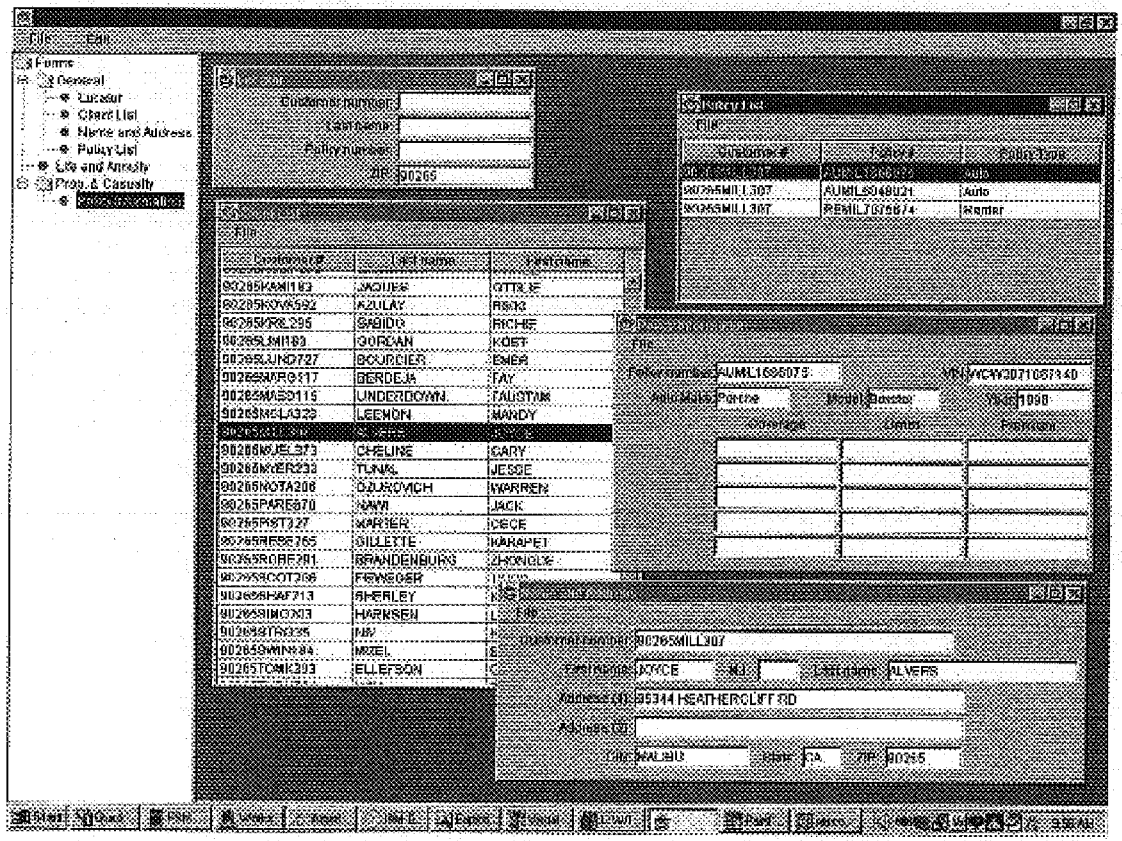
FIG. 12 is a screen print showing the graphic user interface (GUI) similar to FIG. 11 but additionally with the "Policy Information" window open.

The mechanism for this is as follows. When the user enters a name in the "Locator panel", a DataCapsule 301 is created and sent to the DataRouter 303. This DataCapsule will have a domain of "DAA_DEMO" and a category of "DAA_DEMO_PARTY_LIST_REQUEST". Since the PartyListProvider has registered with the DataRouter 303 as being interested in this category of message, the PartyListProvider then converts the DataCapsule 301 into XML and passes it to a process running on an enterprise server (possibly a Servlet or EJB (Enterprise Java Bean) running on a Web or Application server). That process reads the XML message and interacts with the enterprise data store. The results are passed back to the PartListProvider as DataCapsules in XML format. The PartListProvider then reads the XML document, creates the DataCapsule 301 which will be have a category of "DAA_DEMQ_PARTY_LIST" and passes it on to the DataRouter 303. The "Client List" GUI module, shown in FIG. 8, has registered for this category of DataCapsule, so when it receives the notification, it displays the information contained in the DataCapsule 301 which is the list of clients, as shown in FIG. 9. The user can then select the appropriate entry. This selection generates an additional DataCapsule requesting detailed information on the client. That goes through the same process as the first request and may end up causing the display of name and address information, as shown in FIG. 11, if that form has been activated by the user. This scenario can similarly cascade to a "PolicyList" GUI, shown in FIG. 10, if that form has been activated and on to a "PolicyDetail" GUI, as shown in FIG. 12.

The basic premise here is that GUI objects have expressed interest in receiving certain categories of information and are capable of generating requests for information that may be of interest to other components. The model is not strictly limited to GUI components and Data access components. If you wish to place business logic components in the application, you may do that also. Typically, these will be introduced into the system not by the XML configuration file, but indirectly as one of the GUI or Data access components is instantiated. However, it is a simple extension to include business logic modules in the configuration file.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A distributed application assembly system comprising:

a client application running on a client machine, the client application being part of a networked application on a network infrastructure and providing a user working on the client machine the ability to interact with enterprise data on the network infrastructure, the client application being dynamically constructed at a time of use by discovering on the network infrastructure, and loading from the network infrastructure, two types of software components, the first type of software component being a Graphical User Interface (GUI) which allows the user to interact with the client machine by some input device, and the second type of component being an Enterprise Data Adapter (EDA) which allows the dynamically constructed application to locate, obtain, and update enterprise data which exists persistently somewhere on the network infrastructure;

business logic contained in one or more tiers of the networked application dealing with processing operations on the network infrastructure, the business logic operations being implemented using a Business Logic (BL) objects, the client application communicating with the Business Logic objects; and a data repository storing data models which define an enterprise and accessed by the business logic to provide ubiquitous semantics used by other layers of the networked application allowing for the propagation of an underlying enterprise data model to all layers of the networked application.

2. The distributed application assembly system recited in claim 1, further comprising means within the network infrastructure for dynamically creating the business logic as part of an application assembly session.

3. The distributed application assembly system recited in claim 1, further comprising a generic data encapsulation method implemented on the network infrastructure for communication among objects in the client application.

4. The distributed application assembly system recited in claim 1, further comprising a generic data encapsulation method implemented on the network infrastructure for communication among objects in the business logic.

* * * * *